INVENTOR.
John J. Saeli
BY
His Attorney

United States Patent Office 3,348,112
Patented Oct. 17, 1967

3,348,112
TRANSISTORIZED D.C. MOTOR SPEED
CONTROL SYSTEM
John J. Saeli, Rochester, N.Y., assignor to General Motors
Corporation, Detroit, Mich., a corporation of Delaware
Filed Dec. 1, 1964, Ser. No. 415,039
10 Claims. (Cl. 318—332)

ABSTRACT OF THE DISCLOSURE

This invention relates to a transistorized speed control circuit for direct current motors. The potential taken from the movable contact of a potentiometer connected across the direct current potential source is applied across the armature of a direct current motor through the base-emitter electrodes of a power transistor, the collector-emitter electrodes of which are connected in series with the armature. The collector-emitter electrodes of a feedback transistor are connected in series with a feedback resistor between the movable contact of the potentiometer and the supply line which forward poles this device and the base electrode is connected in the armature circuit. Therefore, the degree of conduction of the feedback transistor and, hence the voltage across the feedback resistor is proportional to armature current. The voltage across the feedback resistor is algebraically summed with the voltage across the potentiometer movable contact and the opposite direct current supply line, thereby providing for variations in armature voltage in response to the manual adjustment of the potentiometer and armature speed.

---

This invention pertains to speed control systems for direct current motors, and particularly to a transistorized, infinitely variable speed control system for brush type direct current motors designed for operating vehicular windshield wiper mechanisms.

Heretofore, multiple speed operation of direct current electric motor driven windshield wiper mechanisms has been achieved through either field resistance control or armature resistance control. In the field resistance control system, motor speed is controlled by varying the resistance connected in series with the shunt field windings, as shown for example in Patent No. 2,985,024. In the armature resistance speed control system, speed is adjusted by varying the resistance in the armature circuit. Both of the aforementioned speed control systems have rather poor speed regulation with varying loads. The present invention is directed to an infinitely variable speed control for a direct current motor through adjustment of armature voltage while making available maximum torque irrespective of the speed setting.

Accordingly, among my objects are the provision of a transistorized speed control for direct current motors including current feedback means to improve speed regulation with varying loads; the further provision of a transistorized speed control of the aforesaid type including means for varying the armature voltage and controlling armature voltage through emitter-follower action of the transistor means; and the still further provision of a speed control system of the aforesaid type including a current feedback circuit for automatically regulating armature voltage in accordance with motor load.

The aforementioned and other objects are accomplished in the present invention by connecting power transistor means in the armature circuit of the motor in combination with a current feedback circuit responsive to motor load for improving the speed regulation of the direct current motor with varying loads.

Further objects and advantages of the present invention will be apparent from the following description, reference being had to the accompanying drawing, wherein preferred embodiments of the present invention are clearly shown and wherein similar numerals depict similar parts throughout the several views.

Figure 1:
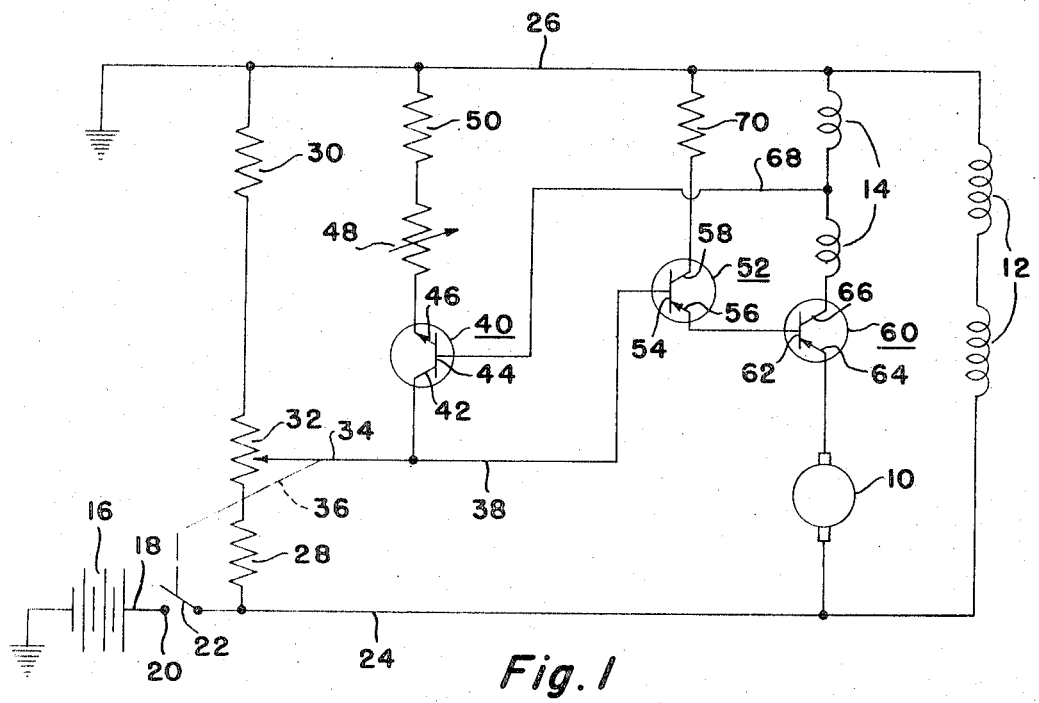
FIGURE 1 is a schematic circuit diagram of one embodiment of a transistorized motor speed control in accordance with my invention.

Referring to FIGURE 1, an embodiment of my transistorized speed control system is shown comprising an electric motor having a wound armature 10, a shunt field winding 12 and a series field winding 14. The system includes a direct current battery 16 having its negative terminal connected to ground and its positive terminal connected to a wire 18 and a stationary switch contact 20. The stationary switch contact 20 is engageable by a movable switch contact 22 connected to a wire 24, and the wire 24 connects with one terminal of the armature 10 as well as one terminal of the shunt field winding 12. The other terminal of the shunt field winding 12 as well as one terminal of the series field winding 14 are connected to a wire 26 which is grounded.

A voltage divider network is connected between wires 24 and 26 and comprises fixed resistors 28 and 30 and a potentiometer 32 having a movable slider 34 connected with the switch 22 by a mechanical linkage 36. In addition, the slider 34 is connected to a wire 38. The wire 38 is connected to the collector electrode 42 of an NPN transistor 40 having a base electrode 44 and an emitter electrode 46. The emitter electrode 46 is connected through a variable resistor 48 and a fixed resistor 50 to the wire 26. The collector electrode 42 of the transistor 40 is connected by wire 38 to the base electrode 54 of a second transistor 52 of the PNP type having an emitter electrode 56 and a collector electrode 58. The emitter electrode 56 of the transistor 52 is connected to the base electrode 62 with a third transistor 60 connected in the armature circuit of the motor. The third transistor 60 is likewise of the PNP type and has its emitter electrode 64 connected to one terminal of the armature 10 and its collector electrode 66 connected to one terminal of the series field winding 14.

The series field winding includes two coils, as shown, and the junction between the two series field winding coils is connected by wire 68 to the base electrode 44 of the feedback transistor 40. The collector electrode 58 of the transistor 52 is connected through a fixed resistor 70 to the wire 26.

When the manual control switch 22 is closed, the direct current motor will be energized and the speed can be infinitely adjusted by adjusting the potentiometer slider 34 so as to vary the armature voltage. The voltage across the armature 10 is approximately equal to the voltage between wire 24 and the slider 34. Current and power gain is accomplished by transistors 52 and 60 such that a relatively low voltage divider network current controls a relatively large armature current. For example, in a normal 12 volt motor system, the voltage divider current through resistors 28 and 32 and the potentiometer 34 may be on the order of 18 milliamperes whereas the armature current may be on the order of 13 amperes. The power transistors 60 and 52 operate in the emitter-follower mode, and a current feedback circuit is provided for speed regulation with varying motor loads. This current feedback circuit is through transistor 40 and resistors 48 and 50 whereby a small voltage signal is developed across resistors 48 and 50 which is directly proportional to armature current. This voltage is amplified and added to the voltage between the potentiometer slider 34 and the wire 24. The algebraic sum of the voltage between the slider 34 and the wire 24 and the amplifier feedback voltage is substantially equal to the voltage across the armature. Consequently, the voltage across the armature increases with armature current until transistor 60 becomes saturated. Upon saturation of transistor 60 the voltage across the armature and motor speed will decrease with a further increase in the load imposed on the motor as evidenced by the armature current, provided saturation of the transistor 60 occurs before the motor stalls. The value of armature current at which transistor 60 becomes saturated can be varied by adjusting the variable resistor 48 for a given speed setting of the potentiometer slider 34.

Figures 2, 3:
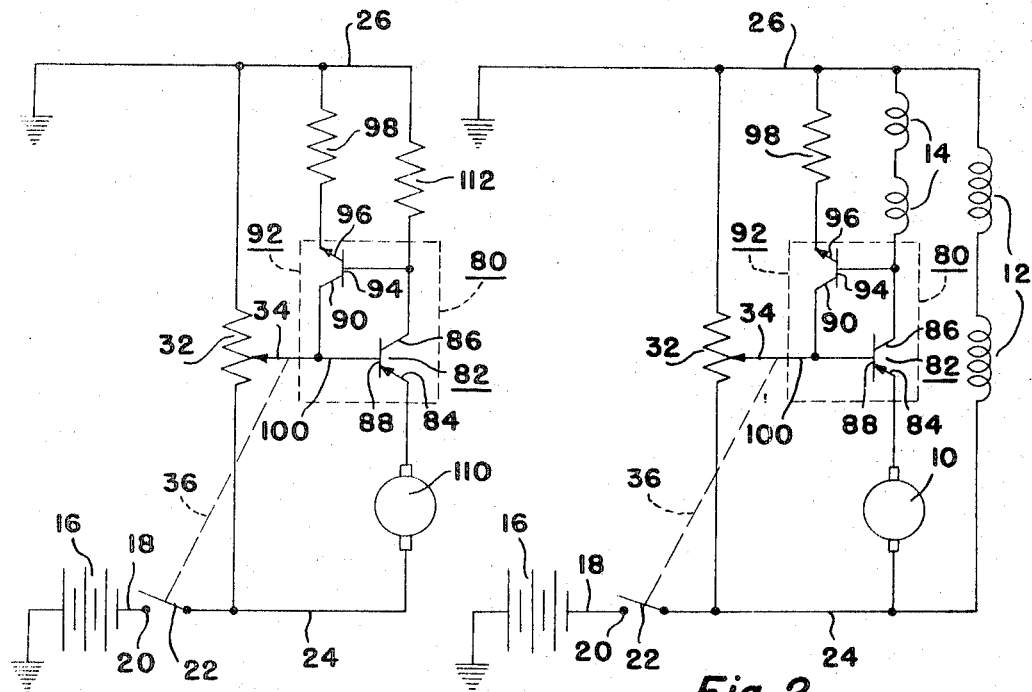
FIGURE 2 is a schematic circuit diagram of the preferred embodiment of a speed control system in accordance with my invention.
FIGURE 3 is a schematic circuit diagram of a modification of my invention comprising a control system for a permanent magnet motor.

Referring to FIGURE 2, the preferred transistorized speed control system embodies a unitary four terminal semiconductor device 80 to replace transistors 40, 52 and 60. This four terminal semiconductor device includes PNP power transistor 82 having its emitter electrode 84 connected with the armature 10 and its collector electrode 86 connected with the series field winding 14. The base electrode 88 of the transistor 82 is connected to the collector electrode 90 of an NPN feedback transistor 92 having its base electrode 94 connected to one terminal of the series field winding 14 and its emitter electrode 96 connected through a resistor 98 to the wire 26. The collector electrode 90 of the transistor 92 is connected by wire 100 to the slider 34 of the potentiometer which constitutes the entire voltage divider network between wires 24 and 26.

Referring to FIGURE 3, the transistorized control is shown in combination with a permanent magnet motor having a wound armature 110 and a permanent magnet field, one terminal of the armature being connected to wire 24 and the other terminal of the armature being connected to the emitter 84 of transistor 82 constituting a component of the four terminal semiconductor device 80. The base 88 of the transistor 82 is connected to wire 100, which connects with the potentiometer slider 34 as well as the collector 90 of transistor 90. The base 94 of transistor 92 is connected between the collector 86 of transistor 82 and to a resistor 112 connected in the armature circuit of the permanent magnet motor and across which a feedback signal is developed. The emitter 96 of the transistor 92 is connected through resistor 98 to the ground wire 26. As in the FIGURE 2 embodiment, the potentiometer 32 is connected between wires 24 and 26, and the slider 34 is interconnected through mechanical linkage 36 to the movable switch contact 22 of the manual switch which includes a stationary contact 20 connected by wire 18 to one terminal of the battery 16.

The speed control system shown in FIGURES 2 and 3 operates in the following manner. The power transistor 82 operates in the emitter-follower mode, and the transistor 92 is connected in the current feedback circuit including the resistor 98. In the circuit shown in FIGURE 2 the current feedback signal is developed across the series field winding 14 of the motor, whereas in the circuit shown in FIGURE 3 the current feedback signal is developed across the resistor 112 in the armature circuit of the permanent magnet motor. The voltage signal developed across resistor 98, in both the FIGURES 2 and 3 circuits, is directly proportional to armature current, and this voltage is amplified and added to the voltage between potentiometer slider 34 and the wire 24. The algebraic sum of the voltage between the slider 34 and the wire 24 and the amplified feedback voltage is substantially equal to the voltage across the armature.

The speed control systems of this invention are infinitely variable between the predetermined maximum and minimum speeds as determined by the setting of the potentiometer 32 and achieve greatly improved speed regulation at any speed setting with varying motor loads.

While the embodiments of the invention as herein disclosed constitute preferred forms, it is to be understood that other forms might be adopted.

What is claimed is as follows:

1. A motor speed control system including, a direct current electric motor having an armature circuit, a series field winding and a shunt field winding, an electric power source, an energizing circuit for said motor and a control circuit for said energizing circuit including a potentiometer connected with said power source and said armature circuit for adjusting the voltage applied across said armature circuit, power transistor means operating in the emitter-follower mode connected in said armature circuit and with said potentiometer, and means responsive to current flow through said armature circuit for controlling said armature circuit voltage to regulate the speed of said motor under varying load conditions.

2. A motor speed control system including, a direct current electric motor having an armature circuit, a series field winding and a shunt field winding, an electric power source, an energizing circuit for said motor, a control circuit for said energizing circuit comprising a voltage divider network connected across said power source including a potentiometer having a slider connected with said armature circuit for adjusting the armature circuit voltage, power transistor means connected in said armature circuit and with the slider of said potentiometer, and means responsive to current flow through said armature circuit for controlling said armature circuit voltage to regulate the speed of said motor under varying load conditions.

3. A motor speed control system including, a direct current electric motor having an armature circuit, a series field winding and a shunt field winding, an electric power source, an energizing circuit for said motor and a control circuit for said energizing circuit comprising a voltage divider network connected across said power source including a potentiomtaer having a slider connected with said armature circuit for adjusting the armature circuit voltage, power transistor means connected in said armature circuit and with the slider of said potentiometer, and a feedback circuit connected with said series field winding and the slider of said potentiometer and responsive to current flow through said armature circuit for controlling the armature circuit voltage to regulate the speed of said motor under varying load conditions.

4. The motor speed control system set forth in claim 3 wherein said energizing circuit includes a manual switch.

5. The motor speed control system set forth in claim 3 wherein said transistor means comprises a pair of transistors operated in the emitter-follower mode.

6. The motor speed control system set forth in claim 3 wherein said feedback circuit includes a transistor.

7. The motor speed control system set forth in claim 3 wherein said power transistor means comprises a single transistor operating in the emitter-follower mode, and said feedback circuit includes a transistor.

8. The motor speed control system set forth in claim 7 wherein said power transistor and said feedback transistor comprise a unitary semiconductor device.

9. A motor speed control system including, a direct current electric motor having a wound armature and a permanent magnet field, an electric power source, an energizing circuit for said motor and a control circuit for said energizing circuit including a potentiometer connected with said power source and said armature for adjusting the voltage applied across said armature, power transistor means operated in the emitter-follower mode connected with said armature and said potentiometer, and means responsive to current flow through said armature for controlling armature voltage to regulate the speed of said motor under varying load conditions.

10. The motor speed system set forth in claim 9 wherein said last recited means comprises a feedback circuit including a resistor connected in series with said armature and semiconductor means for amplifying the signal developed across said resistor.

References Cited

UNITED STATES PATENTS

| 2,762,005 | 9/1956 | Harvey et al. | 318—345 |
| 2,814,012 | 11/1957 | Swanson | 318—345 |
| 2,975,349 | 3/1961 | Green | 318—45 X |
| 2,981,879 | 4/1961 | Taylor et al. | 318—345 X |
| 3,231,808 | 1/1966 | McDaniel | 318—345 X |

ORIS L. RADER, *Primary Examiner.*

J. J. BAKER, *Assistant Examiner.*